March 31, 1959 C. M. TUTTLE ET AL 2,880,325
PHOTOFLUOROGRAPHY
Filed March 21, 1952 6 Sheets-Sheet 1

INVENTORS
CLIFTON M. TUTTLE
FORDYCE M. BROWN
CARL J. BRASSER
Davis, Hoxie Faithfull
THEIR ATTORNEYS

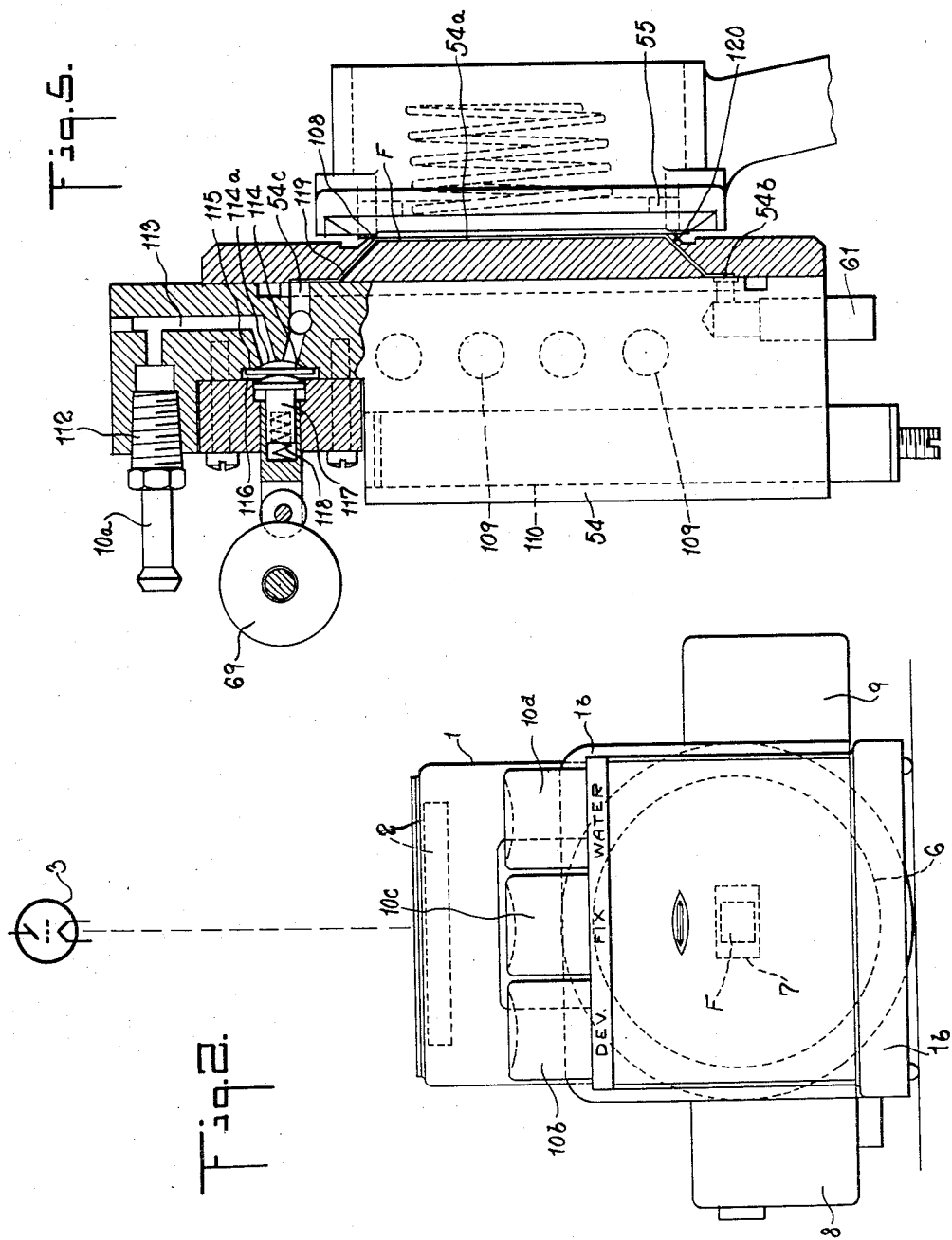

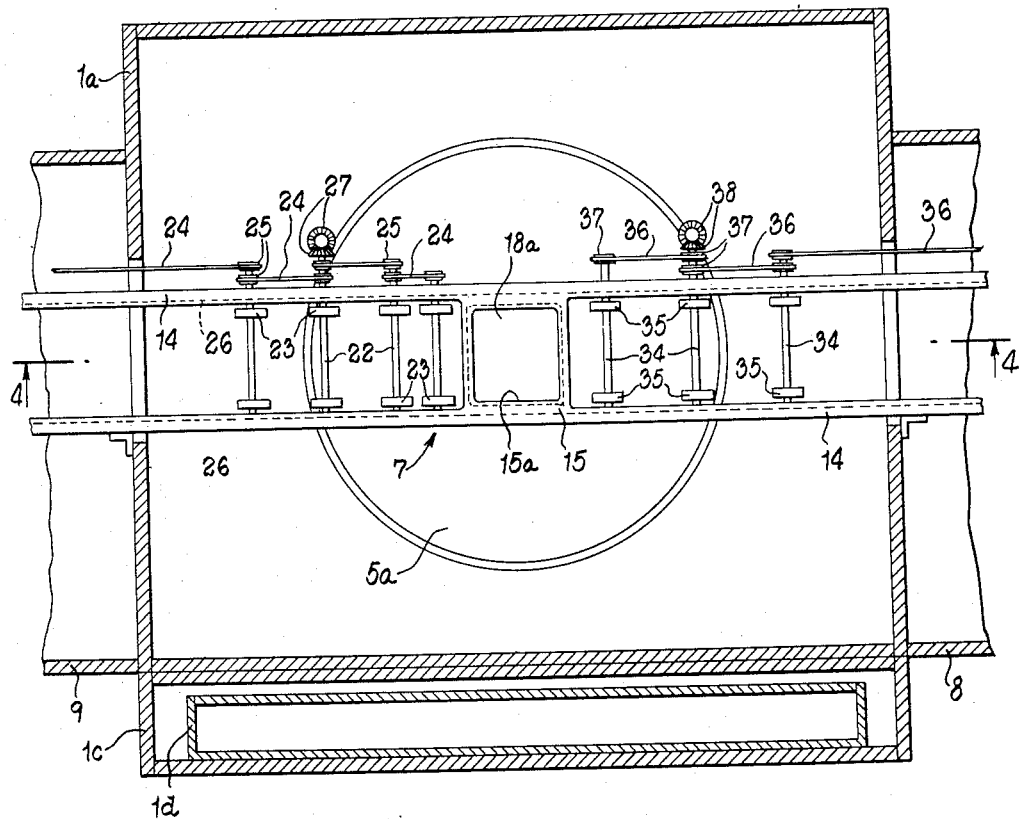

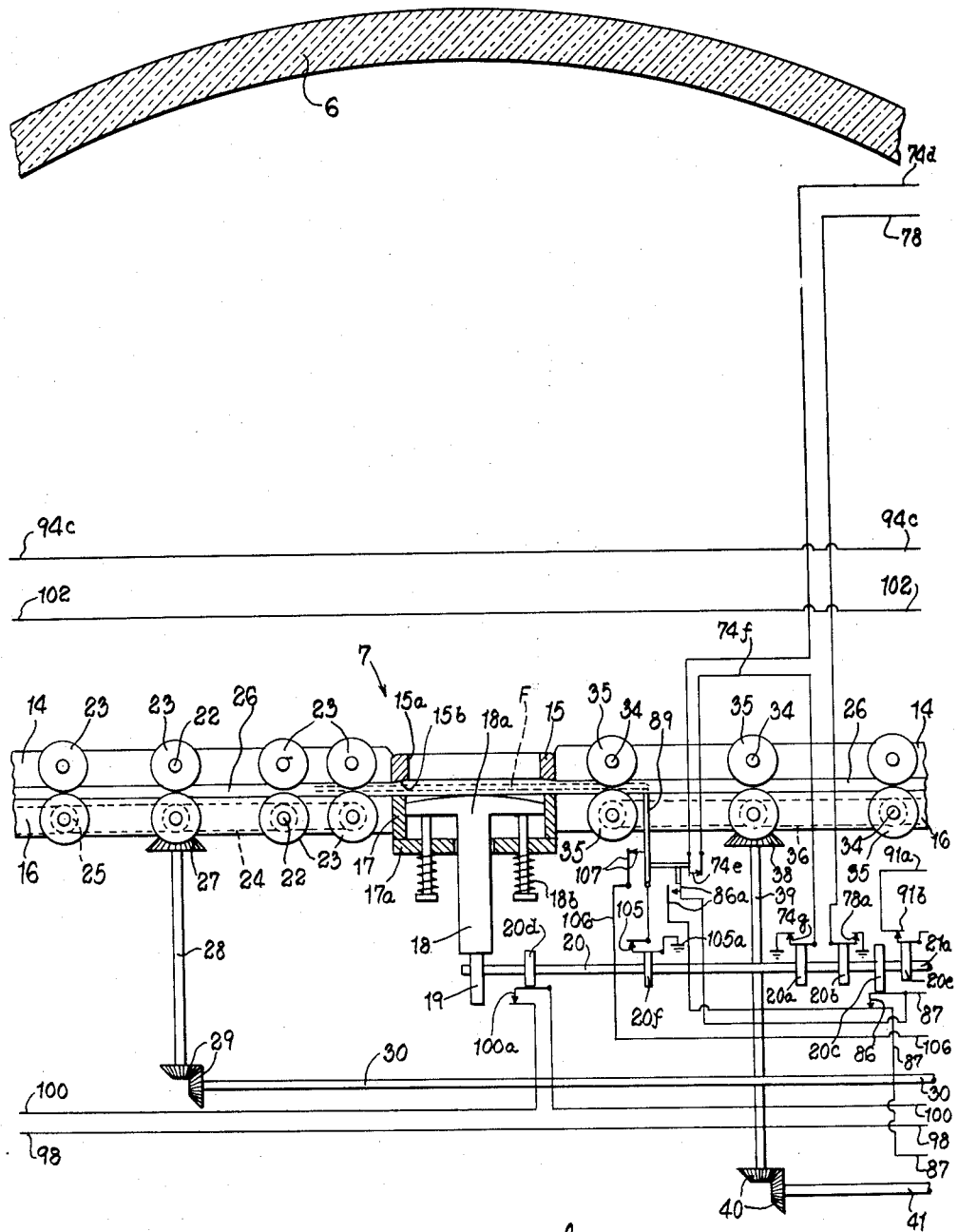

INVENTORS
CLIFTON M. TUTTLE
FORDYCE M. BROWN
CARL J. BRASSER

THEIR ATTORNEYS

2,880,325
Patented Mar. 31, 1959

2,880,325

PHOTOFLUOROGRAPHY

Clifton M. Tuttle and Fordyce M. Brown, Halesite, and Carl J. Brasser, Wantagh, N.Y., assignors, by mesne assignments, to Specialties, Inc., Syosset, N.Y., a corporation of New York Application March 21, 1952, Serial No. 277,756

6 Claims. (Cl. 250—66)

This invention relates to the art of photographing objects and processing the photographic film to develop the image thereon. It has particular reference to an improved apparatus for this purpose.

For illustrative purposes, the invention will be described and illustrated in connection with photofluorography, since it may be used to particular advantage in this field. However, it will be understood that the invention is also applicable to other types of photography.

In optical imaging systems of the so-called Kelner-Schmidt type, consisting essentially of a concave mirror and an aspherical corrector plate, the image surface has the form of a sphere segment. To record a well-defined photographic image with such a system, it is necessary that the sensitive emulsion together with its supporting vehicle (e.g. glass or film base) be deformed from its normally plane condition. In many Schmidt cameras where film is used, areas to be exposed are permanently deformed to a spherical contour by the application of heat and pressure. However, in cases where the film is to be fed automatically to and from the exposure station in the Schmidt system, as in the photofluorographic apparatus disclosed in a co-pending application of Tuttle and Morgan, Serial No. 154,794, filed April 8, 1950, now Patent 2,595,430, more or less permanent deformation of the film in this manner is inconvenient if not impossible. Moreover, such spherically deformed film surface would be difficult if not impossible to process by the technique disclosed in said copending application or by any technique which processes the film rapidly and automatically. Accordingly, we propose to deform the film into a surface other than a plane surface at the instant of exposure, so that the film can be fed to and from the exposure station in a substantially flat condition. However, the problem of thus deforming the film temporarily is complicated by the reason of the nature of photographic film and the requirements of the Schmidt system. Such deformation of the film surface becomes increasingly difficult as the radius of curvature is shortened. For example, in the case of a photofluorographic apparatus using the Schmidt system and adapted to make a picture about 2½ inches square, the optical system may form from a plane object a spherical image surface having a sagitta of about ⅓ of an inch. To deform photographic film, which as is well-known is not completely plastic, into a regular spherical shape corresponding to this image surface is impracticable for the reason that severe wrinkling will occur at the edges of the film. While the film may be deformed with a curvature having a greater radius than that indicated above, without any appreciable wrinkling, this lesser deformation is insufficient to provide a well-defined image of the fluorescent X-ray screen which is to be photographed by the use of the Schmidt system.

One feature of the present invention, therefore, resides in photofluorographic apparatus which overcomes the above-mentioned difficulty. According to this feature of the invention, the fluorescent screen on which the X-rays are projected, and which is to be photographed, is formed with a cylindrical curvature about an axis lying at the opposite side of the screen from the optical system, so that the screen is convex toward the optical system. Thus, the Schmidt image becomes a toroid, that is, a form with lesser curvature in one plane than in another plane at right angles thereto. This form is ideally suited to receive an anisotropic material such as film base. At the instant when the film is to be exposed to the curved fluorescent screen through the Schmidt system, the film is formed into a toroidal shape generated by two arcs of different radii, the centers of both radii lying on the optical axis of the Schmidt system between the film surface and the object or fluorescent screen. In this way, the curvature of the toroid into which the film is thus formed may be considerably less than that which would produce wrinkling of the film, and yet the image formed on the film will be clear and well-defined. The radius of curvature of the cylindrical fluorescent screen is greater than that at which the difficulties due to "scatter" become serious.

In photofluorographic cameras of the type utilizing reflective-refractive optical systems of the Schmidt type, the benefits of the large geometric aperture common to these systems, and through which the photographic film is exposed, are reduced by a shadowing effect. This shadowing effect is caused by the introduction of the film into the center of the optical system through an opaque channel extending through the side of the system. For example, in one such system (Helm), a web of film 70 mm. wide is carried in a loop into and out of the optical path, and in this system an optical aperture having a nominal size of F/0.7 is reduced to an effective aperture of F/0.85. In the system of said co-pending application of Tuttle and Morgan, the film is processed within the optical unit and later withdrawn, the processed image being cut from the film roll and delivered as a separate picture. The introduction of the processing unit in the optical path, together with the film channel, causes an even greater shadowing effect.

Another feature of the invention, therefore, is a photofluorographic apparatus in which this shadowing effect is greatly reduced. According to this feature of the invention, we provide at one side of the optical system a support for a continuous length of unexposed film and also an intermittently operating cutter for cutting the requisite length of film from the main strip prior to exposure of the film. This cut length of the film is introduced into the optical system by a conveyor, comprising rolls or belts, which holds the sensitive film securely and moves it forward to the exposure station at the axis of the optical system. After exposure of the film, it is transferred by a second conveyor to the outside of the optical system and into a processing device of the type disclosed in a co-pending application of Tuttle and Brown, Serial No. 114,701, filed September 9, 1949. Thus, the only shadowing of the beam in the optical system is that caused by the film aperture itself, or film platen, and the rails supporting the film conveyors, these rails also serving to support the film platen. Moreover, the heat applied to the film processing fluids during the processing operation does not have to be applied in the optical system, as in the apparatus disclosed in said Tuttle and Morgan application, but is applied to the processing device outside the optical system. Additionally, the new apparatus is more economical in the use of film, as compared with the Tuttle and Morgan apparatus.

A further feature of the invention resides in an apparatus of the character described in which the conveyors for moving the cut film sections to and from the exposure station in the optical system are operated under control of stops for positioning the film sections at the exposure station and the subsequent processing device or station, respectively, and also under control of the film processing mechanism as well as a metering device for determining the length of each cut section of the film.

Another feature resides in an apparatus of the character described having an interlocking connection between the mechanism for deforming the film at the exposure station and the X-ray apparatus, whereby the latter can be operated only when a film section is in condition for exposure at the exposure station.

Still another feature of the invention resides in an apparatus of this character having operating connections between the film metering and chopping mechanisms, the film conveyors, the mechanism for positioning and deforming the film at the exposure station, the film processing mechanism and a control circuit for the X-ray tube, whereby the various operations incident to exposure and processing of the film are effected automatically in a predetermined sequence upon initiating operation of the X-ray tube.

An additional feature resides in an improved valve for use in controlling the supply of processing fluids to the film processing device.

These and other features of the invention may be better understood by reference to the accompanying drawings, in which:

Fig. 2 is an end view of the apparatus shown in Fig. 1;

Fig. 3 is a partial sectional view on the line 3—3 in Fig. 1;

Figs. 4a, 4b and 4c are partial sectional views on the line 4—4 in Fig. 3, showing schematically the various operating circuits, and Fig. 5 is a partial sectional view of a film processing device embodying the new valve.

Figure 1:
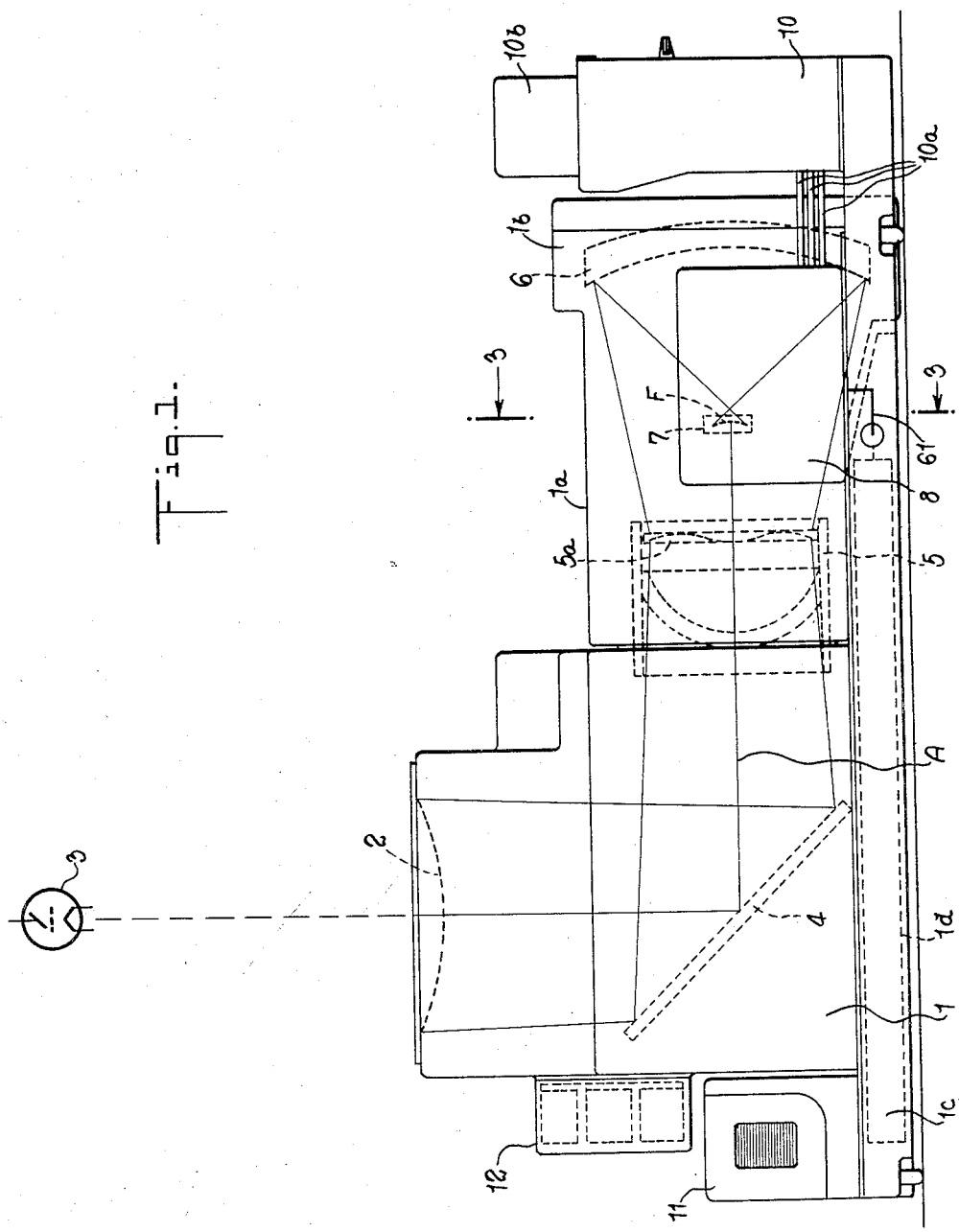
Fig. 1 is a side elevational view of a preferred form of the new apparatus, showing in dotted lines the optical system and the curvatures of the X-ray screen and the photographic film.
Figure 4A:
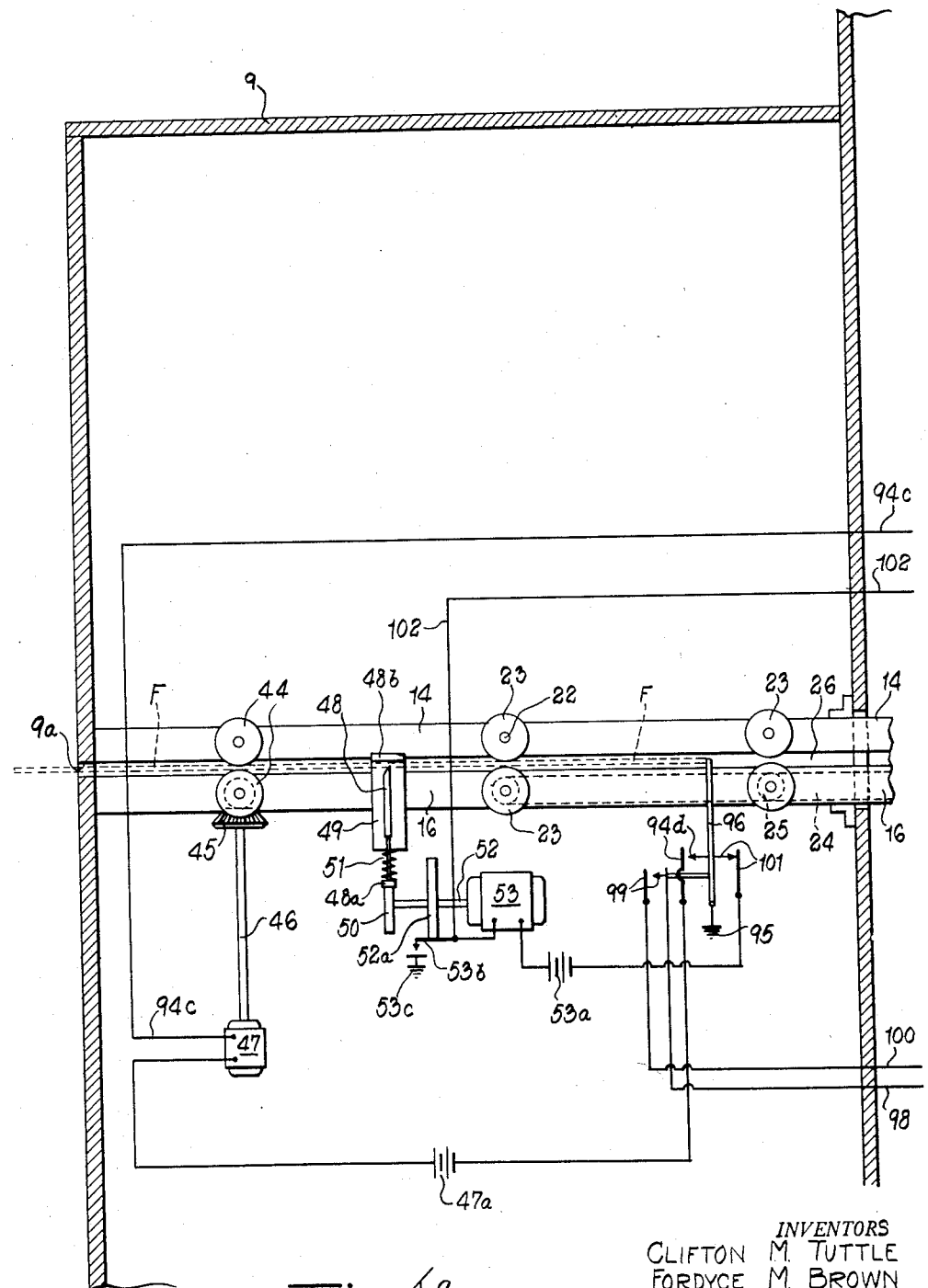
Figure 4C:
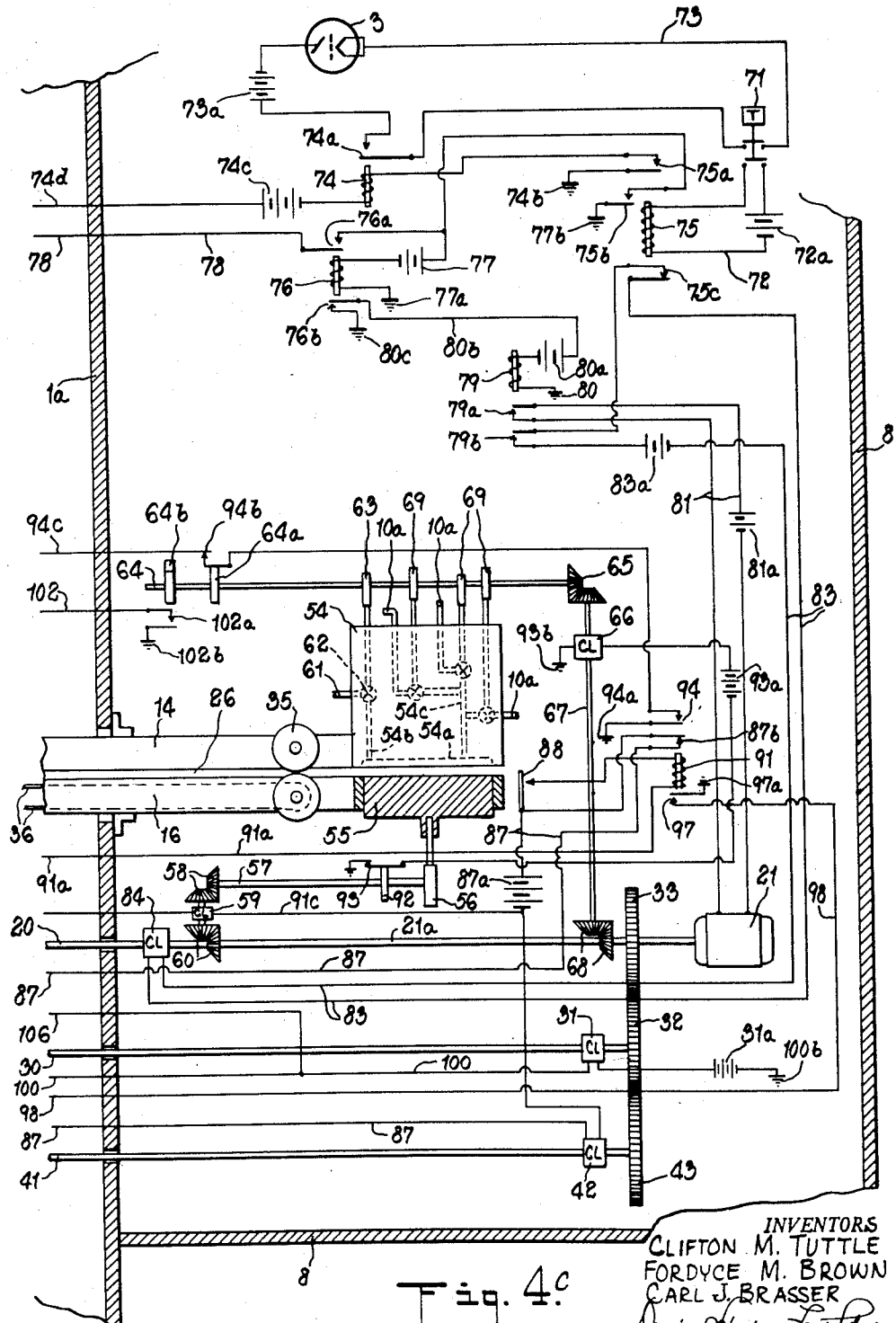

Referring to Figs. 1, 2 and 3, the apparatus there shown comprises a light-tight housing 1 having at the top a generally horizontal fluorescent screen 2 located directly below the X-ray tube 3. Below the X-ray screen 2 is a reflex mirror 4 mounted in the housing 1. Light rays from the screen 2 are reflected by the mirror 4 through the Schmidt optics 5, which include an aspherical corrector plate 5a located in a horizontal extension 1a of the housing. The rays passing through the corrector plate 5a are reflected upon a photographic film F from the concave face of a Schmidt mirror 6 located in an enlargement 1b at the outer end of the horizontal housing section 1a. The film F is located at an exposure station 7 interposed between the mirror 6 and the corrector plate 5a, the exposure station and the film being located on the axis of the optical system.

At one side of the housing 1a is a casing 8 in which the exposed film from the exposure station 7 is received and processed to develop the image on the film; and at the opposite side of housing 1a is another casing 9 where each film section to be exposed is cut to a predetermined length from a supply roll of the film. Thus, the operations of cutting the film sections prior to their exposure and developing them after their exposure are effected outside the optical system represented by the parts 4, 5 and 6. Adjacent the housing section 1b is a stand 10 supporting the containers for the fluids used in processing the exposed film. As shown, there are three containers 10b, 10c and 10d for the developer solution, the fixing solution and the water or washing solution, respectively. Pipes 10a connect the respective fluid containers to the film processing device within the casing 8, as will be described in greater detail presently. The spent fluids are discharged from the casing 8 through pipe 61 into a waste tank 1d located in the base 1c of the apparatus below the housing 1. The tank 1d is maintained under vacuum by a vacuum pump and motor assembly 11 mounted on the base, so that the processing fluids are drawn through the respective supply pipes 10a and the processing device in casing 8 to the tank 1d by the vacuum therein. The various controls for the apparatus may be assembled in a control box 12 on the housing 1.

It will be observed by reference to Figs. 1 and 2 that the fluorescent or X-ray screen 2 is formed as a segment of a cylinder, the screen being bowed downward in the direction of the optical system. As previously mentioned, the effect of this screen curvature is to make the Schmidt image at the exposure station 7 in the form of a toroid. During exposure of the film F at the station 7, it is deformed into this toroidal shape by a mechanism to be described presently, the centers of the radii of the two curvatures of the toroid being located on the corrector plate side of the exposure station 7, on the optical axis A of the Schmidt system. As shown at F in Fig. 1, the centers of these radii are located on the opposite side of the exposure station 7 from the Schmidt mirror 6, so that the convex side of the deformed film faces this mirror. The toroidal shape of the deformed film F will thus correspond to the shape of the Schmidt image projected from the curved screen 2.

Since optical systems of the Schmidt type are well-known in the art, it is unnecessary to describe in further detail the operation of the optical system of the present apparatus.

Referring now to Figs. 3 and 4a, 4b, and 4c, two rails 14 extend horizontally across the housing 1a, one above the other, and these rails are joined by a platen 15 at the central portion of the housing. The rails 14 extend through the side walls of the housing, on which they are suitably supported, and they serve as a support for the platen 15. The latter is provided with a central aperture 15a through which the film F is exposed to the light rays reflected by the Schmidt system. As shown at 15b in Fig. 4b, the platen 15 is a concave toroidal surface whose centers of origin coincide with those of the toroidal surface 18a on plunger 18. This provides a surface against which the film F may be pressed incident to deforming it for the exposure. A second pair of rails 16 extends across the housing 1a adjacent the rails 14 and parallel thereto, the rails 14 being located between the Schmidt mirror 6 and the rails 16. Thus, the housing 1a contains upper rails 14 and 16 lying adjacent each other in a common horizontal plane, and lower rails 14 and 16 lying adjacent each other in a common horizontal plane. The rails 16 likewise extend through and are supported at the side walls of housing 1a, and these rails are joined at the central portion of the housing by a guide 17 for a plunger 18. This plunger has a head formed with a toroidal shaped face 18a adapted to engage the film section F and deform it against the toroidal platen surface 15b. A plate 17a on the guide closely surrounds the plunger 18 to prevent tilting thereof. The plunger 18 is actuated by a cam 19 on a main shaft 20 rotatably mounted in the housing and extending into the casing 8, where it is adapted to be driven by an electric motor 21 through its shaft 21a. During rotation of the shaft 20, the cam 19 moves the plunger 18 into engagement with the base side of the film at the exposure station 7 and forces the emulsion side of the film against the platen 15, whereby the film is deformed into the prescribed toroidal shape corresponding to the shape of the plunger surface 18a. Upon release of the plunger 18 by the cam 19, it is withdrawn from contact with the film by means of springs 18b.

The film section is delivered to the exposure station 7 by a conveyor comprising friction rollers 23 rotatable on vertical shafts 22 on the rails 14 and 16. The shafts 22 are mounted in pairs, each pair consisting of a shaft journaled between the rails 14 and an adjacent parallel shaft journaled between the rails 16. Each shaft carries two rollers 23 which oppose similar rollers on the adjacent shaft. As shown in Fig. 4b, the rollers 23 at the inner end of the conveyor are located close to the exposure station formed by the platen 15, and the rollers at the opposite end of the conveyor are located in the casing 9. The shafts 22 on the rails 16 are interconnected by belts 24 and pulleys 25, so that these shafts and the rollers thereon will rotate in unison. Each pair of adjacent rails 14 and 16 forms a groove 26 adapted to receive one edge of the film F so as to guide the film in its travel along the rails under the action of the rollers 23, which frictionally engage the film at its opposite sides. The rollers on the rails 16 are driven by bevel gears 27 connecting one of the shafts 22 to a shaft 28, the latter being connected through bevel gears 29 to a shaft 30 extending through the housing 1a into the casing 8, where it is connected through an electromagnetic clutch 31 and gears 32 and 33 to the main shaft 21a.

The conveyor for moving the exposed film from the station 7 comprises vertical shafts 34 journaled in pairs between the rails 14 and 16 and carrying rollers 35 arranged similarly to the rollers 23. The rollers 35 on the rails 16 are interconnected through belts 36 and pulleys 37 and are driven independently of the rollers 23 through bevel gears 38 connecting one of the shafts 34 to a shaft 39. The shaft 39 is connected through bevel gears 49, shaft 41, electromagnetic clutch 42 and gear 43 to the gear 32 and the motor 21. The rollers 34 at the left end of this conveyor are located near the exposure station 7, while the rollers at the right end of this conveyor are located in the casing 8. It will be understood that when the shaft 39 is driven, the film F at the exposure station is moved between the rollers 35 of the several pairs and delivered into the casing 8, the film being guided at its edges in the grooves 26.

Within the casing 9 are opposed metering rollers 44 mounted on the rails 14 and 16 and which receive between them the film to be exposed. This film is supplied to the rollers 44 through a slot 9a from a supply roll (not shown). The metering rollers 44 mounted on the rails 16 are adapted to be driven through a bevel gear 45 and shaft 46 from a motor 47. Between the metering rollers 44 and the conveyor rollers 23 is a film chopping blade 48 reciprocable in a guide 49. At its outer end, the blade 48 carries a follower 48a held against a cam 50 by a spring 51. The cam 50 is mounted on a shaft 52 adapted to be driven by a motor 53. When the motor 53 is energized, the cam 50 moves the blade 48 toward an opposing block 48b against which the film is cut by the blade 48; and the blade is then retracted by spring 51 upon further rotation of the shaft 52.

The conveyor rollers 23 serve to transport the cut film section F from the casing 9 to the exposure station 7, and the conveyor rollers 35 serve to convey the exposed film from station 7 to a processing head 54 in the casing 8. The head 54 has a recess 54a of an area corresponding to the exposed area of the film, and the latter is clamped against the processing head over the recess 54a by a plunger 55 adapted to be reciprocated by a cam 56 mounted on a shaft 57. The shaft 57 is connected through bevel gears 58, electromagnetic clutch 59 and bevel gears 60 to the main shaft 21a. The recess 54a in the processing head is connected through a passage 54b to the suction pipe 61 leading into the vacuum waste tank 1d. When there is no film at the processing head 54, the recess 54a is disconnected from the vacuum source by a valve 62 in the processing head, this valve being operated from a cam 63 mounted on a processing shaft 64. The shaft 64 is driven through bevel gear 65 from an electromagnetic clutch 66. The clutch 66 is connected through the shaft 67 and bevel gears 68 to the main shaft 21a. The processing fluids are delivered to the recess 54a through a passage 54c in the processing head, this passage being connected to separate supply passages leading to the pipes 10a for the respective fluids. Each of these supply passage in the processing head has a valve similar to the valve 62 and controlled by a cam 69 on the processing shaft 64, there being a separate cam 69 for each of the processing fluids. When the shaft 64 is rotated through one revolution, the cam 63 first opens valve 62 to connect recess 54a to the suction pipe 61, thereby drawing the edges of the film securely against the head 54 to seal the recess 54a. Then, one of the cams 69 opens its valve to admit the developer solution into the recess 54a through the corresponding pipe 10a and passage 54c, the fluid flowing across the emulsion face of the film in a thin stream and discharging through pipe 61 into the waste tank 1d. The supply of developer fluid is then cut off by its cam 69, and the second cam 69 opens its valve to admit the fixer solution, which flows across the emulsion side of the film and into the suction pipe 61. The supply of fixer solution is then cut off by its cam 69 and the third cam 69 opens its valve to admit the washing solution to the recess 54a. Upon completion of the washing operation, the corresponding cam 69 closes its valve, and then the cam 63 closes the suction valve 62, which completes the cycle.

The various control circuits will be described in conjunction with the operation of the apparatus, as follows:

It will be assumed that the film section F is in position at the exposure station 7 and that the plunger 18 has been actuated to deform the film into the toroidal shape against the platen 15, so that the film is ready for exposure. When the subject to be X-rayed is properly placed between the X-ray tube 3 and the fluorescent screen 2, a double-pole timer switch 71 is closed manually to energize separate circuits 72 and 73. The circuit 73 includes the X-ray tube 3, a current source 73a and a normally open interlock switch 74a of relay 74 which, however, is now closed due to energizing of circuit 72 including current source 72a and relay 75, the latter acting to close its switch 75a and thereby establish an interlock circuit from ground 74b through relay 74, current source 74c, wire 74d, switch 74e (which is held closed by engagement of film F at the exposure station with an adjacent stop arm 89), wire 74f and ground switch 74g (which is held closed by cam 20a on shaft 20). Thus, the X-ray tube 3 is energized and the X-rays are directed upon the subject overlying the screen 2. At the same time, energizing of relay 75 closes its switch 75b and thereby operates a relay 76 of the type which releases with a small time delay, relay 76 being energized through a circuit comprising ground 77a, relay 76, current source 77, relay switch 75b and ground 77b. Energizing of relay 76 closes switch 76a, which establishes a holding circuit comprising ground 77a, relay 76, battery 77, switch 76a, wire 78, and ground switch 78a. At this time, the switch 78a is held closed by cam 20b on shaft 20.

Upon energizing of relay 76 through contact 75b, a relay 79 of the slow release type is energized through a circuit comprising ground 80, relay 79, battery 80a, wire 80b, relay switch 76b and ground 80c. As a result, relay switch 79a is closed to energize the motor 21 through circuit 81, which includes a current source 81a. Also, relay switch 79b is closed at the same time to prepare a circuit 83 which includes this switch, a current source 83a, an electromagnetic clutch 84 connecting shafts 21a and 20, and relay switch 75c, the latter being held open at this time by the relay 75. Consequently, the motor 21 will drive the shaft 21a but the shaft 20 carrying the cams 19, 20a and 20b will remain idle due to the clutch 84 being open.

During the period when the timer switch 71 is closed, the photographic film F at station 7 is exposed to the X-ray image appearing on the fluorescent screen 2, the image being reflected through the platen aperture 15a upon the emulsion surface of the film from the Schmidt mirror 6. Thus, a latent image of the fluorescent screen 2 is produced on the film F while it is held by the plunger surface 18a in a toroidal shape. When the X-ray tube 3 has operated for a sufficient time to produce a clear image on the screen 2, the timer switch 71 opens automatically. While the switch 71 has been referred to as a timer switch, it may be a switch of the type controlled by a photo-cell which operates to open the switch when the light from the fluorescent screen 2 reaches a predetermined quantity under the action of the X-rays from tube 3. Upon opening of switch 71, the circuit 73 and X-ray tube 3 are deenergized, and at the same time the circuit 72 is deenergized and causes the relay switches 75a and 75b to open and the relay switch 75c to close. The relay 76 remains energized after opening of switch 75b, because of the holding circuit previously described through switches 76a and 78a. Closing of switch 75c, due to opening of timer switch 71, completes the circuit previously described through clutch 84, with the result that the shaft 20 is driven and the cam 19 is rotated to retract the plunger 18 and release the film at the exposure station 7. At the same time, cam 20a opens switch 74g and thereby prevents energizing of interlock relay 74 and X-rays tube 3 even if the timer switch 71 is reclosed by the operator. Upon retraction of plunger 18, a cam 20c on shaft 20 closes a switch 86 to energize a circuit 87, which includes the switch 86, electromagnetic clutch 42, current source 87a, and a normally closed relay switch 87b. The clutch 42 then rotates the shafts 41 and 39 to drive the conveyor rollers 35.

Rotation of the rollers 35 causes the exposed film F to be drawn away from the exposure station 7 and toward the processing head 54. When the trailing edge of the film disengages the stop arm 89, adjacent the exposure station, the arm 89 returns to its normal position and allows switches 86a and 107 to close while opening the interlock switch 74e. Closing of switch 86a acts to shunt the switch 86 so that the clutch 42 remains energized after opening of switch 86, which occurs shortly after the film releases switch arm 89. The conveyor rollers 35 move the exposed film between the processing head 54 and the plunger 55, until the leading edge of the film engages a stop or switch arm 88 located at the film outlet end of processing head 54. Arm 88 is thus moved into engagement with its contact and energizes a relay 91 through a circuit comprising battery 87a, switch 88, relay 91, wire 91a, switch 91b (which is closed by cam 20e upon the initial rotation of shaft 20), electric clutch 59 and wire 91c. The clutch 59 is thus energized simultaneously with the relay 91, the latter acting to open its switch 87b and deenergize the clutch 42, so that the rollers 35 are stopped with the exposed film F in position to be processed at the head 54. Energizing of clutch 59 causes the shaft 57 to be driven through one complete revolution from the main shaft 21a. In the first part of this revolution, the cam 56 moves the plunger 55 against the base side of the film so as to hold the film securely in position against the head 54 and over the processing recess 54a.

Energizing of relay 91 also prepares a circuit through the metering motor 47, this circuit comprising ground 94a, relay switch 94, normally open switch 94b, wire 94c, motor 47, current source 47a, normally closed switch 94d and ground 95. At the same time, the relay 91 prepares a circuit from ground 97a through relay switch 97, wire 98, normally closed switch 99, wire 100, normally open switch 100a, electromagnetic clutch 31 and current source 31a to ground 100b. The switch 100a is closed at about this time by cam 20d on shaft 20, that clutch 31 is energized to drive the conveyor rollers 23 through shafts 30 and 28.

When the plunger 55 has closed against the film at the processing head 54, a cam 92 on shaft 57 closes a ground switch 93 which establishes a circuit from ground through current source 93a and electromagnetic clutch 66 to ground 93b. The clutch 66 is thus energized and drives the processing shaft 64 through one complete revolution to effect the processing operations previously described. These processing operations are described in greater detail in the copending application of Tuttle and Brown, Serial No. 114,701, filed September 9, 1949. At the start of the rotation of shaft 64, the metering switch 94b is open. However, when the shaft 64 has rotated through a small part of its revolution, a cam 64a thereon closes switch 94b and completes the circuit previously described through the metering motor 47. This motor then rotates the rollers 44 and advances the film F from the supply roll (not shown) to the rollers 23 at the left end of the latter group of rollers, the rollers 23 being driven at this time from the clutch 31 energized through switches 97, 99 and 100a. The advance of film from the supply roll is continued until the leading edge of the film engages a stop in the form of a switch arm 96, whereupon the switch arm is moved to open the switches 94d and 99 and close the switch 101. Opening of the switch 94d breaks the circuit through the metering motor 47 so that the latter stops, while opening of switch 99 breaks the circuit through clutch 31 so as to stop the conveyor rollers 23. Closing of switch 101 establishes a circuit from ground 95 through switch 101, current source 53a, the chopper motor 53, wire 102 and switch 102a to ground 102b, the switch 102a having been closed by cam 64b upon the initial rotation of the processing shaft 64. The motor 53 is therefore energized and operates the cutting blade 48 through cam 50. When motor shaft 52 has rotated through a small part of a complete revolution, a cam 52a thereon closes a ground switch 53b and thereby continues the energizing of motor 53 independently of switch 102a, which is opened by cam 64b shortly after it has been closed. In other words, the cam 64b simply provides an electric impulse to start the motor 53, after which the operation of the motor is controlled by cam 52a. When the shaft 52 has made a complete revolution, the cam 52a allows switch 53b to open and deenergize the chopper motor. This cycle of the shaft 52 causes the blade 48 to cut from the film supply roll a length corresponding to the distance between the blade 48 and the stop 96.

When the processing shaft 64 has made a complete revolution to complete the film processing operations, the cam 92 allows switch 93 to open and deenergize the clutch 66, thereby stopping the shaft 64 with the adjacent switches 94b and 102a open. Further rotation of shaft 57 causes cam 56 to retract the plunger 55 and thereby release the processed film at the head 54. Cam 20e then opens switch 91b to deenergize relay 91 and clutch 59, the latter, however, completing its full revolution before stopping, so as to complete the cycle of shaft 57. Deenergizing of relay 91 opens the switches 94–97 and closes switch 87b, thereby driving rollers 35 due to operation of clutch 42 through the closed switches 87b and 86a of circuit 87. The processed film may then be removed from the head 54, as by a manual operation or automatically by additional rollers (not shown) operating with the rollers 35, thereby releasing the switch arm 88.

At about the time when cam 20e opens switch 91b to resume the drive of rollers 35, as previously mentioned, a cam 20f on shaft 20 closes a ground switch 105 and thereby establishes a circuit from ground 105a through switch 107, wires 106 and 100, clutch 31, and current source 31a to ground 100b, thereby driving rollers 23. The cut film in casing 9 is then drawn by rollers 23 from the chopping plate 48 toward the exposure station 7. When the trailing edge of this film section disengages the stop 96, the latter returns to its initial position so as to open the switch 101 and close switches 94d and 99, the switch 94b having previously opened under control of cam 64a to prevent reenergizing of the metering motor 47. At about the time when switch 99 closes, switch 100a opens under control of cam 20d, so that clutch 31 remains energized only under control of switches 107 and 105. When the cut film from casing 9 arrives at the stop arm 89, in position to be exposed at the station 7, the arm 89 is actuated by the leading edge of the film to open the switches 107 and 86a, thereby breaking the circuits through the clutches 31 and 42 and stopping the conveyor rollers 23 and 35.

Simultaneously with the opening of switches 107 and 86a by the film arriving at exposure station 7, the switch 74e is closed by the arm 89. Continued rotation of shaft 20 causes its cam 19 to advance the plunger 18 into engagement with the new film at station 7, deforming the film into the prescribed toroidal shape against platen 15, whereby the film is ready for exposure to an X-ray image on screen 2. Upon completion of this advance of plunger 18, cam 20a closes interlock switch 74g so that the circuit 72 of the X-ray tube can again be energized by operation of timer switch 71. When the switch 74g has closed, the cam 20b opens switch 78a in the holding circuit 78 and thus deenergizes relay 76, allowing switches 76a and 76b to open. However, due to the time delay inherent in the release of relay 79, the latter continues to hold its switches 79a and 79b closed for a short period even after the opening of switch 76b. During this short period, shaft 20 is rotated from motor 21 through clutch 84 to complete the revolution of this shaft and return its cams 19 and 20a–20f to their starting positions, thereby reclosing the holding switch 78a. Thus, when the relay switches 79a and 79b open to deenergize motor 21 and clutch 84, upon completion of the cycle of shaft 20, the cams 20a and 20b are in position to hold their switches 74g and 78a closed, and the cams 20c–20f are in position to allow their switches 86, 100a, 91b and 105 to be open. The apparatus is now in condition to repeat the operations previously described, upon actuation of timer switch 71.

It will be apparent that the processed film at the head 54, after release of plunger 55, may be withdrawn from the apparatus at any time prior to the starting of a new cycle by actuation of timer switch 71. When the processed film is withdrawn, it may be subjected to a drying or other auxiliary operation, but it will have a clear image of the fluorescent screen 2. The apparatus is adapted to perform the several operations extremely rapidly, so that the processed film can be withdrawn from the head 54 within approximately one minute from the instant when the timer switch 71 is operated to expose the film. Moreover, immediately upon completion of the cycle, the apparatus is ready for a new cycle, since the exposed film is being replaced by a new film at the exposure station 7 during the operations on the exposed film. Due to the interlock between the X-ray circuit 72 and the switches 74e–74g, as previously described, the apparatus insures that the X-ray apparatus will be operated only when a film is present at the exposure station 7 and properly deformed at that station.

The shadowing effect on the film to be exposed is greatly reduced as compared with prior apparatus of this type, since the rails 14 and 16 permit the light to pass between them to the Schmidt mirror 6 during the exposure, and the exposure station 7 presents a relatively small obstruction to the passage of light from the screen 2.

Referring now to Fig. 5, the film F is shown between the processing head 54 and the plunger 55, the emulsion side of the film overlying the recess 54a for the processing fluids. The plunger 55 seals the film against the narrow edge 108 surrounding the recess 54a. The plunger 55 may, if desired, have a grid or recess connected to a vacuum source to prevent movement of the film into recess 54a due to the Bernoulli effect under the influence of the processing fluids flowing at high velocity through this recess, as disclosed in Maiwald application Ser. No. 175,715, filed July 25, 1950, now Patent 2,587,350. The head 54 may contain electric heating elements 109 controlled by a thermostat 110, to insure that the processing fluids flow through recess 54a at the requisite high temperature to expedite the processing operations.

Each fluid supply pipe 10a communicates with the head 54 through a fitting 112, from which the fluid flows through a channel 113 to a valve similar to valve 62. This valve comprises a rubber-like disc 114 compressed against a shoulder 115 by a collar 116. Acting in a bore in the head 54, a valve stem 117 (similar to the stem 62a) is forced against the disc 114 by the cam 69. This force, transmitted by a spring 118, forces the convex end of stem 117 against the disc 114 which, in turn, is forced against the concave wall 114a and closes off the fluid channel 113 from the manifold 54c leading to one edge of recess 54a. When cam 69 releases the stem 117 and disc 114, the latter moves to the position illustrated in Fig. 5, thereby allowing the fluid from channel 113 to flow through manifold 54c, which is large enough to reduce the fluid velocity to substantially zero. The fluid is then spread out into a thin sheet of uniform velocity in the long narrow channel 119 and continues through the processing recess 54a, channels 120 and 54b, valve 62 (Fig. 4c) and suction pipe 61.

We claim:

1. In a photographic apparatus, the combination of a cylinder segment to be photographed, a concave mirror, an aspherical corrector plate interposed between the segment and mirror and through which a light beam as adapted to pass from the segment to the concave surface of the mirror, a film exposure station mounted in the housing between the plate and mirror and located on an optical axis common thereto, said station having a film exposure aperture facing the mirror, a film deforming member adjacent said station and having a surface of toroidal form, means for actuating said member to move said toroidal surface into a film deforming position against a film at said aperture and then release the film, a source of rays to be projected upon said segment, an energizing circuit for said source, and means responsive to deenergizing of said circuit for operating said actuating means to release the film.

2. A combination according to claim 1, comprising also an interlock connection between said actuating means and circuit for rendering the circuit operative only when the film deforming member is in said film-deforming position.

3. In a photographic apparatus, the combination of a housing, a film exposure station in the housing and having an exposure aperture, spaced rails extending into the housing and supporting said station therein, a film delivery conveyor mounted on said rails in the housing for delivering photographic film to the aperture at said station, a film discharge conveyor mounted on said rails for discharging film from said station, a film processing head at one side of the housing and to which said discharge conveyor heads from the exposure station, a film chopper at another side of the housing and from which the delivery conveyor leads to the exposure station, a stop arm near the chopper and located in the path of film in the delivery conveyor, film-engaging stop arms adjacent the exposure station and the processing head, respectively, means connected to said arm adjacent the processing head for rendering the discharge conveyor inoperative and starting the delivery conveyor, means connected to said last arm for operating the processing head, means connected to the chopper stop arm for rendering the delivery conveyor inoperative and operating the chopper, and means connected to the exposure station stop arm for operating the delivery conveyor independently of the chopper stop arm and stopping the delivery conveyor upon movement of a film to the exposure station.

4. A photographic apparatus comprising a cylinder segment to be photographed, a concave mirror, an aspherical corrector plate interposed between the segment and mirror and through which a light beam is adapted to pass from the segment to the concave surface of the mirror, a housing for the plate and mirror and through which said beam is projected, a film exposure station mounted in the housing between the plate and mirror and located on an optical axis common thereto, said station having a film exposure aperture facing the mirror, conveyor means for delivering film into the housing to said station and discharging film from said station and housing, a film deforming member adjacent said station for flexing the film at said aperture into a curved form corresponding to that of the true image of said segment reflected from the mirror to the aperture, means for operating said conveyor means and film deforming member alternately, a normally inoperative source of rays to be projected upon the cylinder segment, said segment being a fluorescent screen, and interlocking means responsive to deforming of film at said station by said member for rendering said source operative.

5. Apparatus according to claim 4, in which said interlocking means include a device responsive to movement of film by the conveyor means to said station, a device responsive to movement of said member to deform the film at the station, and connections between said devices and source for rendering said source operative.

6. In a photographic apparatus, the combination of a housing, a film exposure station in the housing and having an exposure aperture, spaced rails extending into the housing and supporting said station therein, a film delivery conveyor mounted on said rails in the housing for delivering photographic film to the aperture at said station, a film discharge conveyor mounted on said rails for discharging film from said station, a film processing head at one side of the housing and to which said discharge conveyor heads from the exposure station, film-engaging stop arms adjacent said station and head, respectively, means connected to said arms for controlling the operation of the conveyors and the processing head, a flexible disc in said head and forming the wall of a flow space therein, said space having a curved wall opposing the disc, the head having a processing recess adjacent the path of film moved by the discharge conveyor and also having a fluid supply passage leading through said wall and space to the recess, and a plunger in the head operatively connected to said control means and having a disc-engaging face complementary to the curvature of said wall, the plunger being operable by said control means to press the disc against said wall and thereby cut-off the flow of fluid to the recess.

References Cited in the file of this patent

UNITED STATES PATENTS

| | | |
|---|---|---|
| 1,800,157 | Saunders | Apr. 7, 1931 |
| 1,855,991 | Saunders | Apr. 26, 1932 |
| 2,221,055 | Lundegardh | Nov. 12, 1940 |
| 2,385,681 | Brick | Sept. 25, 1945 |
| 2,446,668 | Tuttle | Aug. 10, 1948 |
| 2,476,007 | Tuttle | July 12, 1949 |
| 2,503,319 | Bouwers | Apr. 11, 1950 |
| 2,528,308 | Helm | Oct. 31, 1950 |
| 2,560,085 | Clausing | July 10, 1951 |
| 2,582,182 | Tuttle | Jan. 8, 1952 |
| 2,593,189 | Rinia | Apr. 15, 1952 |
| 2,595,430 | Tuttle et al. | May 6, 1952 |
| 2,631,511 | Tuttle | Mar. 17, 1953 |

FOREIGN PATENTS

| | | |
|---|---|---|
| 342,887 | Great Britain | Feb. 12, 1931 |